(No Model.)

D. D. WASS.
APPARATUS FOR REMOVING IMPURITIES FROM FEED WATER.

No. 272,806. Patented Feb. 20, 1883.

WITNESSES:
F. McArdle
C. Sedgwick

INVENTOR:
D. D. Wass
BY Munn & Co
ATTORNEYS.

UNITED STATES PATENT OFFICE.

DYSON D. WASS, OF NEW YORK, N. Y., ASSIGNOR TO HIMSELF, JOHN C. HENDERSON, SINCLAIR STUART, AND THORNTON MOTLEY, ALL OF SAME PLACE.

APPARATUS FOR REMOVING IMPURITIES FROM FEED-WATER.

SPECIFICATION forming part of Letters Patent No. 272,806, dated February 20, 1883.

Application filed September 4, 1882. (No model.)

*To all whom it may concern:*

Be it known that I, DYSON D. WASS, of New York city, in the county of New York and State of New York, have invented certain new and useful Improvements in Apparatus for Removing Grease, Air, and other Impurities from Feed-Water, of which the following is a full, clear, and exact description.

The object of my invention is to free the feed-water for boilers, &c., from the grease, mud, air, and other impurities which are usually carried by the feed-water.

The invention is an improvement on the device for removing grease and air from feed-water for which United States Letters Patent No. 245,896 were issued to me on the 16th day of August, 1881; and it consists in a vessel provided with a series of transverse partitions alternately extending from the top and bottom, whereby the vessel will be divided into a series of compartments through which the water must circulate. The grease remains on the surface of the water and passes into a tubular chamber on the side of the vessel, and in communication with the compartments of the same.

The invention further consists in a tube attached to a float and passing into a tube in the top of the vessel, which inner tube is provided with apertures which coincide with apertures in the outer tube when the level of the water in the vessel is depressed, thus permitting the compressed air in the vessel to escape.

The invention further consists in a channel extending longitudinally across the bottom of the vessel, and in devices for placing the feed and outlet pipes in communication with the vessel or with the said channel.

The invention also consists in mud-cocks projecting from the sides of the compartments, at the bottom of the same.

Reference is to be had to the accompanying drawings, forming part of this specification, in which similar letters of reference indicate corresponding parts in all the figures.

Figure 2:
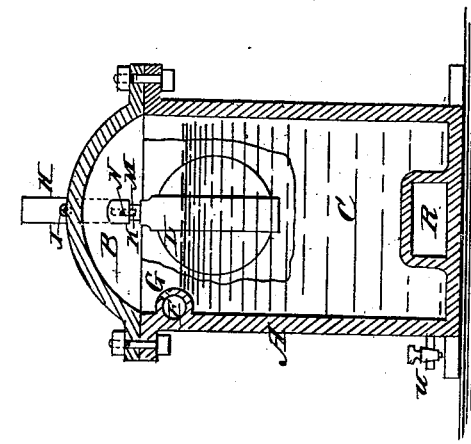
Figure 4:
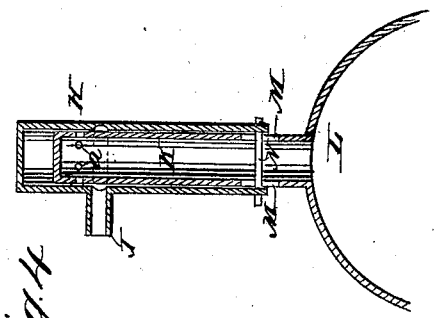
Figure 1:
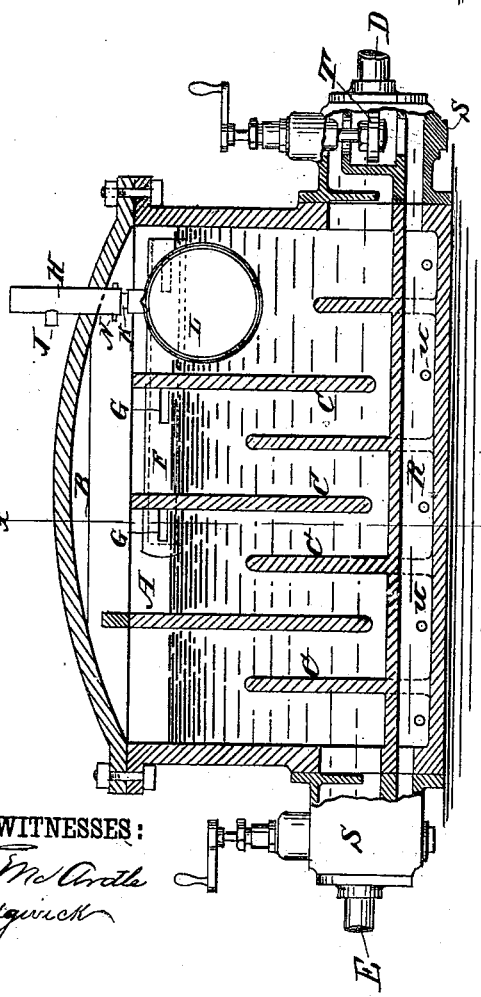
Figure 3:
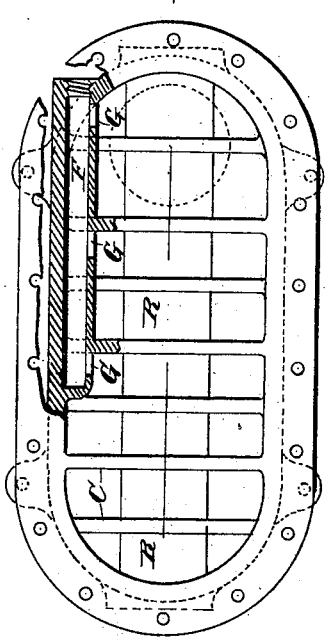

Figure 1 is a longitudinal sectional elevation of my improved device for removing grease, air, and other impurities from feed-water. Fig. 2 is a cross-sectional elevation of the same on the line $x\ x$, Fig. 1. Fig. 3 is a plan view of the same with the end cocks and cover removed, and Fig. 4 is a detail longitudinal sectional elevation of the float in larger size.

A trough-shaped vessel, A, having a cover, B, bolted on the same, is provided with a series of transverse partitions, C, which alternately extend upward from the bottom of the vessel and downward from the cover. A longitudinal channel, R, is formed in the bottom of the box or vessel A, and extends from end to end, and is in communication with two-way cocks S, provided on the ends of the vessel, which cocks S are also in communication with the interior of the vessel A and the inlet and outlet pipes D and E, respectively. If the valves T of the cocks S are raised against the upper seatings, the feed-water passes directly through the channel R, and if the valves T are on the lower seatings the feed-water must circulate through the vessel or box A. Thus if any parts of the vessel A are broken, damaged, or out of order the feed-water can be conducted through the channel R, and the communication in the feed-water pipe will not be interrupted. A series of compartments are formed by the transverse partitions C, through which compartments the feed-water must pass. Each compartment is provided at the bottom of one side with a straight cock, $u$, for blowing off the mud and sediment that collect on the bottom of the compartments. A tubular compartment, F, is formed at the upper edge of one side of the vessel, and the same is provided with apertures G, which establish a communication between the compartments in the vessel A and the tube F. A cock is screwed in the outer end of the tube F. A tube, H, provided with a spout J, projects from the cover of the vessel A, and contains a sliding tube, K, the lower end of which terminates in a bulb or float, L. At or near its upper end the said tube K is provided with a series of apertures, $a$. The lower part of the tube K is provided with slots M, through which a transverse pin, N, passes, which is secured in the sides of the tube H to guide the tube K. The grease in the water collects on the surface of the same and passes through the apertures G into the tube F, in which it collects, and from which it can be drawn off at suitable intervals. The water passes through the vessel in a serpentine course, and the grease collects on the surface of the water in the several compartments. The air collects in the top of the vessel, and as the air gradually accumulates the pressure increases and presses the water-level downward. The float L descends with the water level, and thereby the apertures $a$ will be brought to coincide with the spout J. The air passes through the slots M, the tube K, the apertures $a$, and the spout J. The accumulated air in the vessel can thus escape and the level of the water will rise again, thereby moving the apertures $a$ above the spout J, so that the communication between the outer air and the interior of the vessel A will be interrupted. The sediment, mud, &c., collect on the bottom of the compartments to escape through cocks $u$.

Having thus described my invention, what I claim as new, and desire to secure by Letters Patent, is—

1. The vessel A, having the tube F, provided with an outlet, and with apertures G in one side, said tube being disposed within said vessel, at the upper end thereof, and having its apertures arranged at about on line with the water-level, as and for the purpose set forth.

2. The combination, with the vessel A, provided with transverse partitions C, of the tube H, provided with the air-outlet J, and the sliding tube K, attached to a float, L, and provided with apertures $a$ and M, substantially as herein shown and described, and for the purpose set forth.

3. The combination, with the vessel A, provided with transverse partitions C, and with a tube, F, for collecting the grease, of an automatically-operating outlet for the air that collects in the vessel, substantially as herein shown and described, and for the purpose set forth.

4. The combination, with the tube K, connected to float L and slotted at M, of the tube H, having stop N to limit the movements of the float in opening and closing communication between apertures $a$ and outlet J, substantially as shown and described.

5. The vessel A, having the longitudinal channel R in its bottom, and a chamber at one end, said chamber having a passage communicating with the said channel, and a passage communicating with the vessel or chamber A, and the two-way cock S, adapted to operate in connection with either of the aforesaid passages, as shown and described, and for the purpose set forth.

6. The combination, with the vessel A, provided with transverse partitions C, and a longitudinal channel, R, on its bottom, of the two-way cocks S at the ends of the said channel, substantially as herein shown and described, and for the purpose set forth.

DYSON D. WASS.

Witnesses:
OSCAR F. GUNZ,
EDGAR TATE.